United States Patent
Hansen et al.

(10) Patent No.: US 9,338,143 B2
(45) Date of Patent: May 10, 2016

(54) STATELESS WEB CONTENT ANTI-AUTOMATION

(71) Applicant: Shape Security, Inc., Palo Alto, CA (US)

(72) Inventors: Marc R. Hansen, Mountain View, CA (US); Sumit Agarwal, Palo Alto, CA (US); Subramanian Varadarajan, San Jose, CA (US); Justin D. Call, Santa Clara, CA (US)

(73) Assignee: Shape Security, Inc., Palo Alto, CA (US)

( * ) Notice: Subject to any disclaimer, the term of this patent is extended or adjusted under 35 U.S.C. 154(b) by 60 days.

(21) Appl. No.: 14/055,714

(22) Filed: Oct. 16, 2013

(65) Prior Publication Data

US 2014/0282872 A1 Sep. 18, 2014

Related U.S. Application Data

(60) Provisional application No. 61/801,142, filed on Mar. 15, 2013.

(51) Int. Cl.
*H04L 29/06* (2006.01)

(52) U.S. Cl.
CPC ........ *H04L 63/0428* (2013.01); *H04L 63/0471* (2013.01); *H04L 63/102* (2013.01); *H04L 63/123* (2013.01); *H04L 63/145* (2013.01); *H04L 63/1483* (2013.01); *H04L 63/168* (2013.01)

(58) Field of Classification Search
None
See application file for complete search history.

(56) References Cited

U.S. PATENT DOCUMENTS

| 7,117,429 | B2 | 10/2006 | Vedullapalli et al. |
| 7,480,385 | B2 | 1/2009 | Weber |
| 7,500,099 | B1 | 3/2009 | McElwee et al. |
| 7,707,223 | B2 | 4/2010 | Zubenko et al. |
| 7,836,425 | B2 | 11/2010 | Rubin et al. |

(Continued)

FOREIGN PATENT DOCUMENTS

| CN | 101471818 | 5/2011 |
| GB | 2443093 | 4/2008 |

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages, Jun. 2012.

(Continued)

*Primary Examiner* — Fatoumata Traore
(74) *Attorney, Agent, or Firm* — Fish & Richardson P.C.

(57) ABSTRACT

A computer-implemented method for coordinating content transformation includes receiving, at a computer server subsystem and from a web server system, computer code to be served in response to a request from a computing client over the internet; modifying the computer code to obscure operation of the web server system that could be determined from the computer code; generating transformation information that is needed in order to reverse the modifications of the computer code to obscure the operation of the web server system; and serving to the computing client the modified code and the reverse transformation information.

26 Claims, 6 Drawing Sheets

(56) References Cited

U.S. PATENT DOCUMENTS

| | | | |
|---|---|---|---|
| 7,895,653 | B2 | 2/2011 | Calo et al. |
| 8,020,193 | B2 | 9/2011 | Bhola et al. |
| 8,086,756 | B2 | 12/2011 | Kamyshenko et al. |
| 8,086,957 | B2 | 12/2011 | Bauchot et al. |
| 8,170,020 | B2 | 5/2012 | Oliver et al. |
| 8,200,958 | B2 | 6/2012 | Coppola et al. |
| 8,225,401 | B2 | 7/2012 | Sobel et al. |
| 8,266,202 | B1 | 9/2012 | Colton et al. |
| 8,332,952 | B2 | 12/2012 | Zhang et al. |
| 8,347,396 | B2 | 1/2013 | Grigsby et al. |
| 8,527,774 | B2 | 9/2013 | Fallows et al. |
| 8,533,480 | B2 | 9/2013 | Pravetz et al. |
| 8,555,388 | B1 | 10/2013 | Wang et al. |
| 8,621,197 | B2 | 12/2013 | Suryanarayana et al. |
| 2002/0099827 | A1 | 7/2002 | Shah et al. |
| 2004/0162994 | A1 | 8/2004 | Cohen et al. |
| 2008/0222736 | A1 | 9/2008 | Boodaei et al. |
| 2009/0070459 | A1 | 3/2009 | Cho et al. |
| 2009/0099988 | A1 | 4/2009 | Stokes et al. |
| 2009/0193513 | A1 | 7/2009 | Agarwal et al. |
| 2009/0241174 | A1 | 9/2009 | Rajan et al. |
| 2009/0249310 | A1 | 10/2009 | Meijer et al. |
| 2009/0282062 | A1 | 11/2009 | Husic |
| 2009/0292984 | A1 | 11/2009 | Bauchot et al. |
| 2010/0100927 | A1 | 4/2010 | Bhola et al. |
| 2010/0235637 | A1 | 9/2010 | Lu et al. |
| 2010/0235910 | A1 | 9/2010 | Ku et al. |
| 2010/0257354 | A1 | 10/2010 | Johnston et al. |
| 2010/0262780 | A1 | 10/2010 | Mahan et al. |
| 2011/0015917 | A1 | 1/2011 | Wang et al. |
| 2011/0131416 | A1 | 6/2011 | Schneider |
| 2011/0154021 | A1 | 6/2011 | McCann et al. |
| 2011/0178973 | A1 | 7/2011 | Lopez et al. |
| 2011/0255689 | A1* | 10/2011 | Bolotov et al. ............... 380/42 |
| 2011/0296391 | A1 | 12/2011 | Gass et al. |
| 2011/0320816 | A1 | 12/2011 | Yao et al. |
| 2012/0011262 | A1 | 1/2012 | Cheng et al. |
| 2012/0022942 | A1 | 1/2012 | Holloway et al. |
| 2012/0096116 | A1 | 4/2012 | Mislove et al. |
| 2012/0124372 | A1* | 5/2012 | Dilley et al. ............... 713/162 |
| 2012/0173870 | A1 | 7/2012 | Reddy et al. |
| 2012/0198528 | A1* | 8/2012 | Baumhof ............... 726/6 |
| 2012/0216251 | A1 | 8/2012 | Kumar et al. |
| 2013/0091582 | A1 | 4/2013 | Chen et al. |
| 2013/0198607 | A1 | 8/2013 | Mischook et al. |
| 2013/0219256 | A1 | 8/2013 | Lloyd et al. |
| 2013/0227397 | A1 | 8/2013 | Tvorun et al. |
| 2013/0232234 | A1 | 9/2013 | Kapur et al. |
| 2013/0263264 | A1 | 10/2013 | Klein et al. |
| 2013/0340043 | A1 | 12/2013 | Zarei et al. |
| 2014/0040787 | A1 | 2/2014 | Mills et al. |
| 2014/0089786 | A1 | 3/2014 | Hashmi |

FOREIGN PATENT DOCUMENTS

| | | | |
|---|---|---|---|
| WO | WO9964967 | A1 | 12/1999 |
| WO | WO02088951 | A1 | 11/2002 |
| WO | WO2013091709 | A1 | 6/2013 |

OTHER PUBLICATIONS

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

RSA, "RSA Offers Advanced Solutions to Help Combat Man-in-the-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sood and Enbody, "A Browser Malware Taxonomy," Virus Bulletin, Jun. 2011. Retrieved from the Internet: <URL: http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.

Sood et al., "The Art of Stealing Banking Information—Form grabbing on Fire," Virus Bulletin, Nov. 2011, Retrieved from the Internet: <URL: http://www.virusbtn.com/virusbulletin/archive/2011/11/vb201111-form-grabbing>, 5 pages.

Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.

Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

International Search Report and Written Opinion for Application No. PCT/US2014/023897, dated Jul. 18, 2014, 9 pages.

Currie et al., "In-the-wire authentication: Protecting client-side critical data fields in secure network transactions," 2nd International Conference on Adaptive Science and Technology, 2009, pp. 232-237.

Li et al., "WebShield: Enabling various web defense techniques without client side modifications," in Proceedings of the 18th Annual Network and Distributed System Security Symposium (NDSS), 2011, 18 pages.

Pattabiraman and Zorn, "DoDOM: Leveraging DOM Invariants for Web 2.0 Application Robustness Testing," 2010 IEEE 21st International Symposium on Software Reliability Engineering, pp. 191-200.

Rieck et al. "Cujo: Efficient Detection and Prevention of Drive-by-Download Attacks," ACSAC 2010, Austin, Texas, Dec. 6-10, 9 pages.

* cited by examiner

STATELESS WEB CONTENT ANTI-AUTOMATION

CROSS-REFERENCE TO RELATED APPLICATIONS

This application claims priority under 35 U.S.C. §119(e)(1), to U.S. Provisional Application Ser. No. 61/801,142, filed on Mar. 15, 2013, the entire contents of which are incorporated herein by reference.

TECHNICAL FIELD

This document generally relates to computer security, and more specifically to efforts to prevent malware from automatically attacking web and other content.

BACKGROUND

Computer fraud is big business both for the fraudsters and the people who try to stop them. One common area of computer fraud involves attempts by organizations to infiltrate computers of ordinary people, and by that action to trick those people into giving up confidential information, such as credit card information and access codes. For example, via an exploit commonly termed "Man in the Browser," a user's computer can be provided with code that intercepts legitimate communications by the user, such as with the user's bank, and does so after the communications have been decrypted, e.g., by a web browser on the computer. Such code may alter the interface that the user sees, such as by generating an interface that looks to the user like their bank is requesting particular information (e.g., a PIN number) when in fact the bank would never request such information via a web page. Alternatively, the code may generate an interface that indicates to a user that a banking or shopping transaction was executed as the user requested, when in fact, the illegal organization altered the transaction so as to send the user's money to an entity associated with the organization.

Various approaches have been taken to identify and prevent such malicious activity. For example, programs have been developed for operation on client computers or at the servers of the organizations that own and operate the client computer to detect improper activity.

SUMMARY

This document describes systems and techniques by which web code (e.g., HTML, CSS, and JavaScript) is modified before it is served over the internet by a server system so as to make more difficult the exploitation of the server system by clients that receive the code (including clients that are infected without their users' knowledge). The modifications may differ for different times that a web page and related content are served, whether to the same client computer or to different client computers. Specifically, two different users (or a single user in two different web browsing sessions) may be served slightly different code in response to the same requests, where the difference may be in implicit parts of the code that are not displayed so that the differences are not noticeable to the user or users. For example, the names that are served to a client device for various software objects may be changed in essentially random ways each time a page is served. A main purpose of such action is to create a moving target with the code, so that malicious code cannot use predictability of the code in order to interact with the content in a malicious way. In one example, changing the code served to client devices in an essentially random manner each time the code is served can deter malicious code executing on the client computers (e.g., Man in the Browser bot) from interacting with the served code in a predictable way so as to trick a user of the client computer into providing confidential financial information and the like. Moreover, external programs generally cannot drive web application functionality directly, and so preventing predictable interaction with served code can be an effective means of preventing malicious computer activity.

In general, creating a moving, unpredictable target by modifying aspects of web code each time it is served can prevent or deter a wide variety of computer attacks. For example, such techniques can be used to combat credential stuffing, in which malicious parties obtain leaked or cracked user credentials for a given web service and then use automated bots to perform credential testing at other websites or services based on the illicitly obtained credentials. By changing the content and structure of the web code each time it served, bots that seek to either listen for user credentials or to perform automated credential testing may be thwarted by random changes in the web code that significantly complicate the bot's task of determining how to effectively interact with the web code.

Likewise, other forms of computer attacks can also be prevented or deterred by the web code transformations described in this document. Some of these attacks include: (a) denial of service attacks, and particularly advanced application denial of service attacks, where a malicious party targets a particular functionality of a website (e.g., a widget or other web application) and floods the server with requests for that functionality until the server can no longer respond to requests from legitimate users; (b) rating manipulation schemes in which fraudulent parties use automated scripts to generate a large number of positive or negative reviews of some entity such as a marketed product or business in order to artificially skew the average rating for the entity up or down; (c) fake account creation in which malicious parties use automated scripts to establish and use fake accounts on one or more web services to engage in attacks ranging from content spam, e-mail spam, identity theft, phishing, ratings manipulation, fraudulent reviews, and countless others; (d) fraudulent reservation of rival goods, where a malicious party exploits flaws in a merchant's website to engage in a form of online scalping by purchasing all or a substantial amount of the merchant's inventory and quickly turning around to sell the inventory at a significant markup; (e) ballot stuffing, where automated bots are used to register a large number of fraudulent poll responses; (f) website scraping, where both malicious parties and others (e.g., commercial competitors), use automated programs to obtain and collect data such as user reviews, articles, or technical information published by a website, and where the scraped data is used for commercial purposes that may threaten to undercut the origin website's investment in the scraped content; and (g) web vulnerability assessments in which malicious parties scan any number of websites for security vulnerabilities by analyzing the web code and structure of each site.

The systems, methods, and techniques for web code modifications described in this paper can prevent or deter each of these types of attacks. For example, by randomizing the implicit references in web code that may be used for making requests to a web server or by randomly injecting distracter fields into the code that were not originally part of the code provided by the web server, the effectiveness of bots and other malicious automated scripts is substantially diminished.

As such, malicious activity can be both deflected and detected in relatively sophisticated manners by changing the environment in which executable code on the client device, such as JavaScript, operates (in addition to changing corresponding references in the HTML code). Deflection occurs by the constant changing of code elements as they are served each time, such as changing the names of elements that will be called by malicious JavaScript, so that the malicious code can never catch up with the changes, and thus gives itself away when it tries to interoperate with code known by the system to be stale. Detection can occur by identifying certain JavaScript operations or calls that may be made on a page, and instrumenting code that is served with a web page so as to report to a security server system when such operations occur and/or such calls are made (along with information that describes the actions). Specifically, malicious code may try to call an item that it believes to be part of a static page, where that item is not part of the dynamically altered code that was actually served, and such a false call can be detected and reported.

As one example, a common method for making changes to a document object model (DOM) for a web page is the document.write method, and may be used by malicious code to surreptitiously change what the user of a computing device sees on a web page. A security system can (1) instrument served code corresponding to such a method so that the instrumentation code reports calls to the method, and additional includes data that characterizes such calls, so that the system can detect abnormal activity and perhaps use the additional data to determine whether the abnormal activity is malicious or benign; and (2) change the function name to "document.#3@1*87%5.write," "1@2234$56%.4$4$345%4.@12111@", or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumeand continually changed include "getElementById," "getElementByName," XPath commands, and setting of HTML elements in the DOM to particular values.

The modification of code that is described in more detail below may be carried out by a security system that may supplement a web server system, and may intercept requests from client computers to the web server system and intercept responses from web servers of the system when they serve content back to the client computers (including where pieces of the content are served by different server systems). The modification may be of static code (e.g., HTML) and of related executable code (e.g., JavaScript) in combination. For example, the names of certain elements on a web page defined via HTML may be changed, as may references to items external to the HTML (e.g., CSS and JavaScript code). For example, the name of a label may be changed from a name provided by a programmer to an essentially random name like $4@376&8*. Such renaming may occur by first identifying programmatically related elements across the different types of code that are to be served to the client computer (e.g., HTML, CSS, and JavaScript) and grouping such occurrences of elements for further processing (e.g., by generating flags that point to each such element or copying a portion of each such element). Such processing may occur by modifying each element throughout the different formats of code, such as changing a name in the manner above each time that name occurs in a parameter, method call, DOM operation, or elsewhere. The modified elements may then be placed into the code to be delivered to the client computer, by recoding the code that was sent from the web server system, and serving the recoded code. Such a process may be repeated each time a client computer requests code, and the modifications may be different for each serving of the same code.

Such modification of the served code can help to prevent bots or other malicious code operating on client computers from exploiting perceived weaknesses in the web server system. For example, the names of functions or variables may be changed in various random manners each time a server system serves the code. As noted above, such constantly changing modifications may interfere with the ability of malicious parties to identify how the server system operates and web pages are structured, so that the malicious party cannot generate code to automatically exploit that structure in dishonest manners. In referring to random modification, this document refers to changes between different sessions or page loads that prevent someone at an end terminal or controlling an end terminal to identify a pattern in the server-generated activity. For example, a reversible function may change the names when serving the code, and may interpret any HTTP requests received back from a client by changing the names in an opposite direction (so that the responses can be interpreted properly by the web servers even though the responses are submitted by the clients with labels that are different than those that the web servers originally used in the code). Such techniques may create a moving target that can prevent malicious organizations from reverse-engineering the operation of a web site so as to build automated bots that can interact with the web site, and potentially carry out Man-in-the-Browser and other Man-in-the-Middle operations and attacks.

The ability to modify code that is served and to, in effect, reverse modify requests that are received back from a client device, can be made easier and more flexible by implementing the security server system as a stateless system, i.e., one that does not have to keep track of sessions with various client device in between communications with those devices. One such way to implement a statement system is to have the client device keep track of state-related information during such interstitial periods. As described in more detail below, for example, an initialization vector and ciphertext that represents a code used to transform the outgoing content may be provided as a session cookie to the client device when the content is provided. The client device may then submit that cookie information when it makes a subsequent request. That request may include transformed information that the web server system would not understand, so the security system needs to perform a reverse transformation on it. The system may thus use the vector and ciphertext (along with its own private key) without having to store and keep track of it in order to perform the reverse transformation before giving the request to the web server system.

As for identifying (rather than preventing) malicious activity, the code that is served to requesting clients, in addition to or as an alternative to being randomly modified so as to prevent automated malicious interactions at network endpoints, may be supplemented with instrumentation code that is programmed to identify alien content in the rendered web page on the client. That instrumentation code that runs on the client may, for example, be programmed to identify a function call for a function name that does not match function calls that are permissible for a particular served web page (e.g., where the alien call may be one that matches a name from the page originally provided by a web server but does not match the revised name generated by the code alteration techniques discussed in the prior paragraph). Such alien content may simply be an indication that the user has installed a legitimate plug-in to his or her browser, or it may also be an indication that the user's computer has become infected with malicious code (e.g., JavaScript code). Additional techniques may be used once alien content is identified so as to determine whether the content is malicious or benign.

The techniques discussed here may be carried out by a server subsystem that acts as an adjunct to a web server system that is commonly employed by a provider of web content. For example, as discussed in more detail below, an internet retailer may have an existing system by which it presents a web storefront at a web site (e.g., www.examplestore.com), interacts with customers to show them information about items available for purchase through the storefront, and processes order and payment information through that same storefront. The techniques discussed here may be carried out by the retailer adding a separate server subsystem (either physical or virtualized) that stands between the prior system and the internet. The new subsystem may act to receive web code from the web servers (or from a traffic management system that receives the code from the web servers), may translate that code in random manners before serving it to clients, may receive responses from clients and translate them in the opposite direction, and then provide that information to the web servers using the original names and other data. In addition, such a system may provide the retailer or a third party with whom the retailer contracts (e.g., a web security company that monitors data from many different clients and helps them identify suspect or malicious activity) with information that identifies suspicious transactions. For example, the security subsystem may keep a log of abnormal interactions, may refer particular interactions to a human administrator for later analysis or for real-time intervention, may cause a financial system to act as if a transaction occurred (so as to fool code operating on a client computer) but to stop such a transaction, or any number of other techniques that may be used to deal with attempted fraudulent transactions.

In certain implementations, the operation of a stateless security server system may provide one or more advantages. For example, certain implementations may eliminate a need to store and manage initialization vectors and other information needed to reverse-transform requests, which may be particularly relevant where many sessions are occurring at one time, and many of them never have a return request, such that the credentials would need to be saved for a time and constantly cleaned up by a system if a stateless approach were not used. Also, a stateless approach like those discussed here may eliminate the need to selectively direct return traffic to a particular security server sub-system. In particular, because the data needed for reverse transformations comes with the request, the request can be handled by any system that is executing the same transformation function as the original sub-system (as long as they all have access to the private key where such is needed in a particular implementation). Moreover, such an approach may permit for automatic correlation of state with externally linked CSS and JavaScript files.

In one implementation, a computer-implemented method is disclosed for coordinating content transformation. The method comprises receiving, at a computer server subsystem and from a web server system, computer code to be served in response to a request from a computing client over the internet; modifying the computer code to obscure operation of the web server system that could be determined from the computer code; generating transformation information that is needed in order to reverse the modifications of the computer code to obscure the operation of the web server system; and serving to the computing client the modified code and the reverse transformation information. At least some of the reverse transformation information can be encrypted so that code on the client computer cannot access the reverse transformation information. Also, the reverse transformation information can comprise a nonce and ciphertext. The method may also comprise receiving a subsequent request and the transformation information from the computing client, and using the transformation information to apply a reverse transformation to a portion of the request. Moreover, the method can include applying a private key held by the computer server system to the transformation information.

In another implementation, a computer system for coordinating content transformation is disclosed. The system can include a web server that is configured to provide a resource in the form of computer code to client computing devices in response to requests from the client computing devices; and a security intermediary that is configured to (i) receive the resource from the web server before the resource is provided to the first client computing device, (ii) process the received resource, and (iii) transmit the processed resource and reverse transformation information to the first client computing device, wherein the reverse transformation information comprises information that is needed in order to reverse the modifications of the computer code to obscure the operation of the web server system. The system can include a computer interface configured to receive resources from a web server that has been served in the form of computer code to client computing devices in response to requests from the client computing devices.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
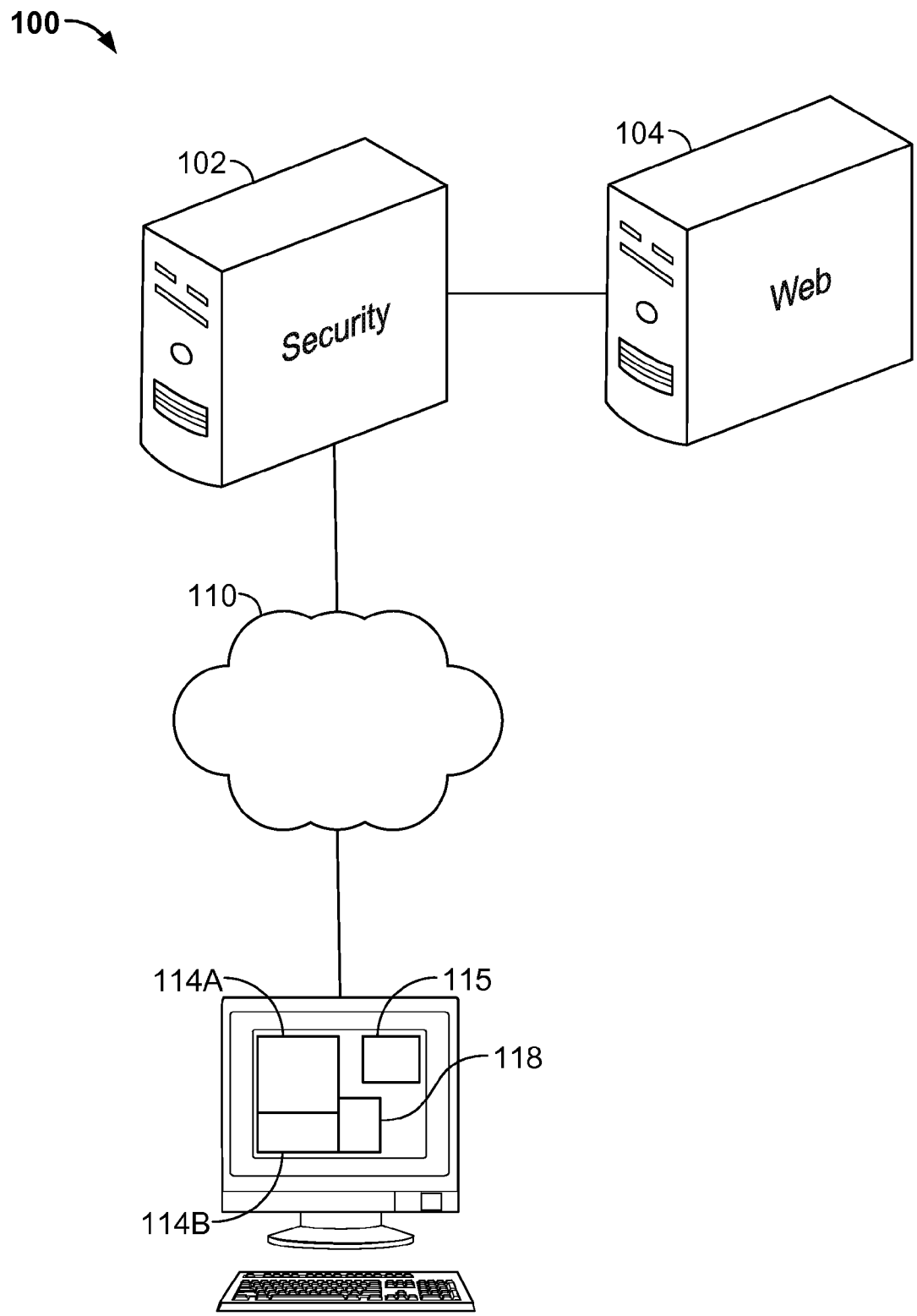
FIG. 1A depicts a schematic diagram of an example system for serving web code and monitoring actions of client computers.

FIG. 1A is a schematic diagram of a system 100 for serving web code and monitoring actions of client computers to identify abnormal behavior and potentially malicious activity. Web code may include, for example, HTML, CSS, JavaScript, and other program code associated with the content or transmission of web resources such as a web page that may be presented at a client computing device 114. The system 100 can detect and obstruct attempts by fraudsters and computer hackers to learn the structure of a website and exploit security vulnerabilities in the client device 114. For example, malware 118 may infect a client device 114 and gather sensitive information about a user of the device, discreetly modify an online transaction, or deceive a user into engaging in compromising activity such as divulging confidential information. Man-in-the-middle exploits are performed by one type of malware 118 that is difficult to detect on a client device 114, but can use security vulnerabilities at the client to engage in such malicious activity.

The system 100 can serve modified and instrumented web code to the client device 114 to detect and obstruct malware 118 attempts to discern and exploit operations of a web server 104. In this example, the modified web code 114A is represented as a portion of a document on the client device 114, while the instrumentation code 114B is represented as another portion of the client device 114. Such simplified representation is provided for sake of explanation, though actual delivery and execution of the code may take a variety of forms, including by a web browser on the client device 114 rendering a page and potentially accessing additional code (e.g., JavaScript or code from other domains) based on code that is part of the web page, and the browser may build a document object model in a familiar manner by such rendering and execution of the provided code.

The system 100 can include a security intermediary 102 that is logically located between the web server 104 and one or more client devices 114. The security intermediary 102 can receive a portion or all of the traffic, including web code, transmitted between client devices 114 and the web server 104 (and vice-versa). In compliance with a governing security policy, when the web server 104 provides a resource such as a web page in response to a client device 114 request, the web server 104 can forward the response to the security intermediary 102 (perhaps through a load balancer or other data management devices or applications) so that the web code for the response can be modified and also supplemented with instrumentation code 114B. Modification of the web code may be random in certain manners, and can differ each time a response is served to a client to prevent malware 118 from learning the structure or operation of the web server 104, or from being developed by a malicious organization that learns the structure or operation. Additionally, the web code can be supplemented with instrumentation code that is executable on the client device 114. The instrumentation code 114B may detect when abnormal behavior occurs on the client device 114, such as possible unauthorized activity by the malware 118, and can report the occurrence of such activity to the security intermediary 102.

When security intermediary 102 receives requests (e.g., HTTP requests) from clients in response to modified web code being processed on those clients, it can apply reverse modifications to the requests before forwarding the requests to the web server 104. Additionally, the security intermediary 102 can receive reports from the instrumentation code that indicate abnormal behavior on the client device 114, and the intermediary can log these events, alert the web server 104 to possible malicious activity, and send reports about such events to a central security server (not shown). The central security server may, in some implementations, analyze reports in the aggregate from multiple security intermediaries 102, and/or reports from multiple client devices 114 and multiple computing sessions and page loads.

The security intermediary 102 can additionally create a code that defines the transformation that was performed on the web code. For example, a particular function may be applied to strings in the code to generate random text, and that function can be seeded with a code that affects the result of the function—e.g., where application of the same seed and the same text will always produce the same "random" output, but a different seed is used for each request or session so that the served text is seen as random. The served text may also be accompanied with information that may be stored as a cookie 115 on the client device 114. When the client device makes subsequent requests to the web server 104, code on the client device may cause the cookie information to be passed with the request. Such cookie information may include, for example, an initialization vector (as a large random number) for the transformation function and cipertext (e.g., in Base64). The cookie may be treated by the system 100 as a session cookie in this example.

One format for such a cookie may be as follows:

```
Set-Cookie: Nonce=wk04328jsajsdfioj3f
Set-Cookie:
Ciphertext=QmFzZTY0IGVuY29kaW5nIHNjaGVtZXMgYXJlIGNvbW1vbmx5IHVz
ZWQgd2hlbiB0aGVy
ZSBpcyBhIG5lZWQgdG8gZW5jb2RlIGJpbmFyeSBkYXRhIHRoYXQgbmVlZHMg
YmUgc3RvcmVkIGFuZCB0cmFuc2ZlcnJlZCBvdmVyIG1lZGlhIHRoYXQgYXJlIG
Rlc2lnbmVkIHRvIGRlYWwgd2l0aCB0ZXh0dWFsIGRhdGEuIFRoaXMgaXMgdG
```

Figure 1B:
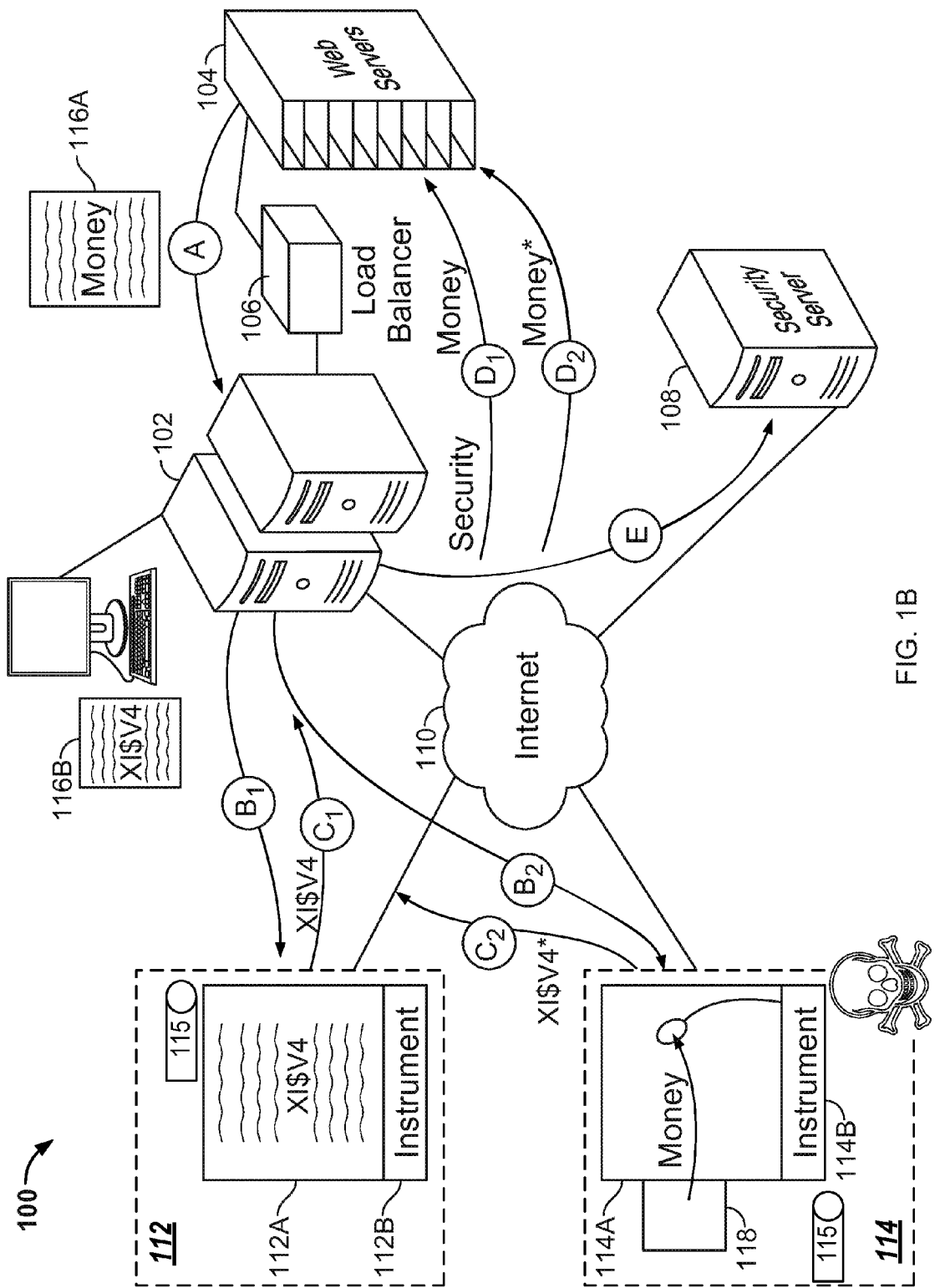
FIG. 1B depicts a system-flow diagram of the example system and example operations of the system for serving web code and monitoring actions of client computers.

FIG. 1B is a schematic diagram of the system 100 depicted in FIG. 1A, including a process for serving code and monitoring actions of client computers to identify anomalous and potentially malicious activity. The system 100 may include a web server 104, security intermediary 102, security server 108, and one or more client devices 112 and 114. Client device 114 has been infected with malware 118 that may attempt to exploit security vulnerabilities at the client device 114 and/or the web server 104, while client device 112 is "clean" or uninfected in this example. For example, the malware 118 may have been written by an organized crime syndicate to identify transactions with a particular bank whose web site structure the syndicate has studied, and may attempt to induce users to provide private information such as PIN codes by recognizing when the bank's web page is loaded by a browser, and interfering with the normal user interface of the bank's web page, such as by generating a pop-up seeking the user's PIN number, in a manner that it looks to the user like the bank generated the pop-up. In an actual implementation, the system 100 would communicate with thousands, tens of thousands, hundreds of thousands, or millions of client devices—some compromised and some clean—over a long time period, though the number here is reduced for the sake of simplification.

The web server 104 (which in normal implementation would be implemented in a large number of physical or virtual servers across one or more data centers, such as in one or more racks of servers) may host electronic resources and provide services over one or more networks such as the internet 110. For example, the web server 104 may serve code for pages of one or more websites by storing resources for each website such as HTML pages, scripts, images, media, and user data at the server 104, and providing the resources upon request. For instance, the web server 104 may receive an HTTP request from a client device 112 that requests the server 104 to provide the client device 112 with a code for generating a webpage. In response, the server 104 retrieves one or more resources associated with the request and transmits them to the requesting client device 112. The server 104 may respond to an HTTP request by serving an HTML file that represents a webpage. The HTML file may reference other resources such as advertisements, images, JavaScript code, or Cascading Style Sheets ("CSS") that the client device 112 can use to load and present the webpage to a user. The web server 104 may provide the referenced files to satisfy the initial request, or may provide the files in response to subsequent requests from the client device 112.

The web server 104 can be implemented with various combinations of software and hardware. In some implementations, the web server 104 can support services other than or in addition to HTTP, including FTP, SSH, TelNet, and/or IMAP, POP, and SMTP for e-mail services. The web server 104 may also support secure connections such as through SSL and HTTPs protocols. Various open-source or commercial software products may be used in implementing the web server 104, such as APACHE web server software or Windows Home Server software. Also, the web server 104 can be comprised of one or more computing devices, such as a distributed server system with multiple connected devices that each provide portions of the operations (e.g., as a server bank, a group of blade servers, or a multi-processor system).

The client computing devices 112 and 114 are capable of communicating information with the web server 104 over a network such as the internet 110. The client devices 112, 114 can include any of a variety of desktop or mobile devices such as a desktop computer, notebook, smartphone, or tablet. The client computing devices may include a network interface card or other hardware for communicating over a wired or wireless network that is connected to the internet 110. The client devices 112, 114 may also include software, such as a web browser or one or more native applications, to allow a user of the client devices 112, 114 to request, load, and interact with web resources such as HTML pages and JavaScript applications from one or more websites served by the web server 104.

Malware 118 may be present on one or more client devices that communicate with the web server 104. In FIGS. 1A and 1B, malware 118 has infected the client device 114, but not client device 112. Malware 118 can include any software that exploits operations of a client or remote computing system such as the web server 104. Malware 118 may engage in various malicious behaviors, including attempts to gather private, digitally-stored information about users such as identification or financial information. Attackers can also use malware 118 to access secure computer systems without authorization, destroy digital information, or gain control of a computer system from an authorized user. Malware 118 may include viruses, Trojan horses, spyware, adware, and other malicious software. Attackers have developed sophisticated methods to deploy malware 118 on client computing devices 118 without a user's knowledge. For example, using phishing and other social engineering techniques, attackers may deceive users into accessing a resource that installs malware 118 on the user's computing system without notice or detection.

Some malware 118 can exploit security vulnerabilities in the client device 114 (including in a browser or browsers executing on the client device 114) to obtain sensitive user account information and to initiate fraudulent transactions. Attackers may use man-in-the-middle attacks, for instance, to intercept communications between the client device 114 and the web server 104. Even where a secure communication protocol is used between the client device 114 and the web server 104, some malware 118 can intercept communications (e.g., after they have been decoded on the client device 114), log information about the communications, and even alter such communications. In man-in-the-browser attacks, the malware 118 may compromise a web browser at client device 114 such that the malware 118 activates when a user visits a particular website. The malware 118 may access information about the website even after code for the site is decrypted, and in some instances, the malware 118 may inject extra code such as HTML or JavaScript to create malicious forms that prompt users to divulge confidential information that can later be transmitted to attackers for further use. Man-in-the-browser malware 118 may also alter an HTTP request from the client device 114 without the user's knowledge to divert a request to an unauthorized server or to implement a fraudulent transaction. For example, in a banking transaction, malware 118 in the client computing device 114 may alter the destination account number in a wire transfer to deliver funds to a mule account rather than an account specified by the user. Some malware 118 may passively reside in the client device 114 to monitor features of a site so that manual or automated attacks on the site's web server 104 can be made at a later time.

Security intermediary 102 may include one or more computing devices (e.g., physical or virtual server instances) that are situated between the client computing devices 112, 114 and the web server 104. The security intermediary 102 receives and processes at least a portion of traffic transmitted between the web server 104 and other computing devices that interact with the web server 104, such as the client devices 112, 114. In some implementations, the security intermediary 102 may be a physical or virtual subsystem of the web server 104. The security intermediary 102 may be configured to modify and/or analyze web code transmitted to and from the web server 104 to detect alien (i.e., abnormal) or malicious transactions and to obscure operations of the web server 104 by various forms of malware.

The security intermediary 102 is forwarded or intercepts traffic transmitted from the web server 104 before the traffic is received by a requesting computer device such as client devices 112 or 114. For example, the security intermediary 102 may receive content from the web server 104 through a direct connection with the web server 104 or through a local area network ("LAN") before transmitting the content over the internet 110. Conversely, the security intermediary 102 may also receive incoming traffic that is destined for the web server 104 so that it can process the traffic before it is received by the web server 104. In some implementations, the security intermediary 102 may be configured as a reverse proxy server that appears to clients to host and serve a website or other electronic resources as if it were the web server 104. In certain implementations, different subserver systems can be used for outgoing service of code and incoming processing of requests, with the subsystems communicating so that one system can provide reverse translations to the translations originally provided by the first subsystem. Such coordination may occur, whether a single security subsystem is used or multiple subsystems are used, such as by storing a cookie or similar identifier on client devices 112, 114, where the identifier can be used as a public key for performing the transformations (where server-side security for private resources can be reliably maintained).

The security intermediary 102 may include one or more computing devices that are separate from computing devices of the web server 104. In such implementations, the security intermediary 102 may communicate directly with the web server through a networking cable such as an Ethernet cable or fiber optic line (and typically through many such connections). The intermediary 102 can also communicate with the web server 104 through a network such as a local area network ("LAN"). In some instances, the intermediary 102 can be installed on the same premises as the web server 104 so that operators or administrators of the web server 104 can also maintain the intermediary 102 locally (particularly for large-volume applications). Installing the intermediary 102 in close proximity to the web server 104 can have one or more additional benefits including reduced transmission latency between the intermediary 102 and the web server 104 and increased security that stems from a private connection between the intermediary 102 and the web server 104 that is isolated from public networks such as the internet 110. This configuration can also avoid any need to encrypt communication between the intermediary 102 and the web server 104, which can be computationally expensive and slow.

In some implementations, the security intermediary 102 may include one or more computing devices that are separate from the computing devices of the web server 104, and that are connected to the web server 104 through a public network such as the internet 110. For example, a third-party security company may maintain one or more security intermediaries 102 on the security company's premises. The security company may offer services to protect websites and/or web servers 104 from exploitation according to the techniques described herein. The security intermediary 102 could then act as a reverse proxy for the web server 104, receiving outbound traffic from the web server 104 over the internet 110, processing the traffic, and forwarding the processed traffic to one or more requesting client devices 112, 114. Likewise, the intermediary 102 may receive incoming traffic from client devices 112, 114 over the internet 110, process the incoming traffic, and forward the processed traffic to the web server 104 over the internet 110. In this configuration, communication between the security intermediary 102 and the web server 104 may be encrypted and secured using protocols such as HTTPS to authenticate the communication and protect against interception or unauthorized listeners over the internet 110. In some embodiments, a private line or network may connect the web server 104 to the remote security intermediary 102, in which case the system 100 may use unencrypted protocols to communicate between the intermediary 102 and web server 104.

In some implementations, security intermediary 102 may be a virtual subsystem of web server 104. For example, the one or more computing devices that implement web server 104 may also include software and/or firmware for the security intermediary 102. The system 100 may include the security intermediary 102 as software that interfaces with, and/or is integrated with, software for the web server 104. For example, when the web server 104 receives a request over the internet 110, the software for the security intermediary 102 can first process the request and then submit the processed request to the web server 104 through an API for the web server 104 software. Similarly, when the web server 104 responds to a request, the response can be submitted to the security intermediary 102 software through an API for processing by security intermediary 102 before the response is transmitted over the internet 110.

In some configurations of the system 100, two or more security intermediaries 102 may serve the web server 104. Redundant security intermediaries 102 can be used to reduce the load on any individual intermediary 102 and to protect against failures in one or more security intermediaries. The system 100 can also balance traffic among two or more security intermediaries 102. For example, the system 100 may categorize traffic into shards that represent a logical portion of traffic to or from a website. Shards may be categorized according to client identity, network information, URL, the domain or host name in an HTTP request, identity of resources requested from the web server 104, location of resources requested from the web server 104, and/or the content of a request or the requested resource 104.

The security intermediary 102 can process traffic transmitted to and from the web server 104. Processing traffic may include analyzing web code to identify alien or malicious activity, reversibly modifying web code to obscure elements of resources provided by the web server 104, and/or inserting instrumentation code into web code provided by the web server 104 to facilitate detection of alien or malicious activity at the client computing device 112, 114. The security intermediary 102 can also apply reverse modifications on requests or other information transmitted by client devices 112, 114. Reverse modifying of requests can effectively make the security intermediary's 102 operations transparent to the web server 104. This document sometimes refers to reverse modifications as inverse modifications and these terms are intended to have the same meanings unless indicated otherwise.

The security intermediary 102 can make various modifications to outgoing web code. In one example, the security intermediary 102 can make random or pseudo-random changes (both of which are covered by the term "random" in this document unless indicated otherwise) in HTML attribute values in links or forms, which the client 112, 114 may translate directly into HTTP protocol elements in subsequent requests to the web server 104. For instance, a web server 104 for an online retailer at www.examplestore.com can provide a text field in a checkout page for a user at the client device 112, 114 to input his or her shipping address. The original HTML web code from the web server 104 may include an HTML tag to create the field: <input type="text" name=shippingaddress>. To obstruct attempts by malware 118 that may have compromised the client device 114 to exploit the field and engage in a fraudulent transaction, the security intermediary 102 can replace one or more attributes for the field, such as by generating a pseudo-random value for the 'name' attribute to replace 'shippingaddress.' The security intermediary 102 may then forward the modified HTML for the webpage to the client device 114. The client device 114 may then generate HTTP requests for the web server 104 that include the modified attribute, such as in a POST request that references the pseudo-random 'name' attribute value. When the security intermediary 102 receives the client device 114 POST request, it applies a reverse modification to the attribute value, replacing the pseudo-random value with the original 'shippingaddress' value, and then forwards the request to web server 104. The security intermediary 102 may store or access translation tables to apply the reverse modifications, or use encrypted content in information associated with the request to apply reverse modifications. Further explanation and examples of security intermediary 102 operations, including techniques for detection and deflection of unauthorized activity, are discussed in further detail with respect to FIGS. 2-4.

The security intermediary 102 can apply different modifications to web code each time the code is served to one or more client devices 112, 114. Applying different or unique modifications before the code is ultimately delivered to the client 112, 114 can frustrate attempts by malware 118 in the client to study and/or exploit the structure of a website or other web application. Each time the web server 104 provides a particular resource, such as a web page, the security intermediary 102 can apply different and unique modifications to the page. Modifications may vary across different users, different clients 112, 114, different sessions, and even different page loads for the same user. For example, a user at client device 112 may receive a particular page with one set of modifications during a first session, and different, second set of modifications during a different session. Similarly, for two different users at client devices 112 and 114, respectively, that request the same resource from web server 104, the security intermediary 102 may apply different modifications to each resource, even if the users made their requests at substantially the same time. By modifying content differently each time it is served, the security intermediary 102 creates a moving target that obstructs attempts by malware 118 to determine a "normal" structure of the site or to identify patterns in the structure of a site. Performing such random modifications makes it more difficult for malware 118 to successfully initiate a fraudulent transaction with the web server 104 or otherwise engage in unauthorized activity.

The modification may be applied according to an initialization vector in the form of a large random number that is generated for each user session with a particular web site. Where the security intermediary 102 is implemented as a stateless embodiment, the security intermediary may send the modified content along with information for a cookie, where the information allows for the reverse modification of any requests from the client device (e.g., where the requests might include text that has been modified and thus would not be recognizable to the web server). Upon receiving such a follow-up request, the security intermediary may parse the transformation information from the request (e.g., to obtain a nonce and ciphertext) and may uses that information to unmodify any modified text in the request.

The system 100 may include a load balancer 106, which can function as a reverse proxy and distribute incoming traffic from client devices 112, 114 among one or more web servers 104 and/or one or more security intermediaries 102. The load balancer 106 can be connected to a network such as the internet 110, one or more web servers 104, and one or more security intermediaries 102. The load balancer 106 analyzes incoming traffic (e.g., traffic destined for the web server 104) and may categorize the traffic into shards. Traffic may be distributed, for example, based on a Layer 4 transport or network layer analysis, or based on a Layer 7 application layer analysis. For example, FTP requests may be channeled to a web server 104 configured to process FTP requests, whereas HTTP requests may be channeled to a web server 104 configured to process HTTP requests. Similarly, in Layer 7 analysis, the load balancer 106 may distribute incoming traffic based on the content of an HTTP header or content of the application message itself. For instance, at an online banking website for www.examplebank.com, certain pages on the site may be unrelated to a customer's online banking experience, such as privacy and terms of use pages for the site. At these pages, the customer does not interact with his bank account, and the customer can only consume or request information from the page, but he cannot post information to the web server 104 from that page. These pages may be deemed a low security risk and the load balancer 106 can be configured to identify low risk pages from HTTP requests in incoming traffic. The load balancer 106 may forward low risk traffic directly to the web server 104 and bypass the security intermediary 102.

The load balancer 106 can also distribute traffic among multiple security intermediaries 102. In one example, incoming traffic can be distributed so that each security intermediary 102 maintains a substantially equal load as the other intermediaries 102 or receives a substantially equal amount of traffic as the other intermediaries 102. In some instances, incoming traffic may be responsive to previously transmitted web code that had been processed and modified by a particular security intermediary 102. The load balancer 106 may distribute such incoming traffic to the particular security intermediary 102 that generated the previously modified code so that the particular security intermediary 102 can apply a reverse modification to web code in the incoming traffic based on a transformation table that may be stored locally on the particular security intermediary 102. In some implementations, however, transformation tables may be shared or accessible by one or more other security intermediaries 102, or modifications may be stateless, so that web code from incoming traffic can be distributed to any intermediary 102.

Once incoming traffic has been distributed to and processed by a security intermediary 102, the load balancer 106 may receive the processed traffic from the security intermediary 102 and forward the traffic to the web server 104.

The load balancer 106 can also distribute outgoing traffic from the web server 104 for processing by a security intermediary 102 before transmitting the traffic to the client device 112, 114. Similar to analyzing incoming traffic, the load balancer 106 may categorize outgoing traffic into shards based on information in the network, transport, or application layers of the traffic. The load balancer 106 may determine that some traffic shards may bypass the security intermediary 102 and may transported over the internet 110 for transmission to a client device 112, 114. Other shards may be distributed to one or more security intermediaries 102 for processing. In implementations of the system 100 that include multiple security intermediaries 102, the load balancer 106 may distribute outgoing traffic to maintain generally equivalent loads among the multiple intermediaries 102. The security intermediaries 102 can then transmit processed traffic back to the load balancer 106 for delivery to client devices 112, 114 over the internet 110.

A configuration module 120 can be used to monitor the system 100 and to configure various aspects of the system's 100 operation. An administrator can use the configuration module 120 to provide system updates, change and load one or more system policies, manage users, select an operation mode, define how to handle exceptions, and/or monitor the health and status of the system 100.

In one implementation, an administrator may use the configuration module 120 to update system software to improve the performance and security of the system. As the system 100 is deployed for periods of time in the field, malware 118 designers may attempt to learn about the system 100 and exploit any detected security vulnerabilities. To prevent this, the system 100, including, for example, the security intermediary 102, can be updated with new software that patches security vulnerabilities and improves system performance. New features may also be introduced such as new algorithms for modifying web code or implementing instrumentation code.

The administrator can also use the configuration module 120 to select or change different system policies. For example, particular modification modes may be selected. The administrator can choose whether the security intermediaries 102 should apply modification techniques that involve only modifying a web application's implicit API (e.g., form fields, links, AJAX calls), for example, or if instrumentation code or other content should be supplemented with the web code. The administrator can also configure how sessions are managed. For example, the security intermediary 102 can be configured to apply a unique session ID each time a client device 112, 114 makes a new request for a web application, or a particular session can be made to last across multiple requests, such as when a user browses multiple pages while logged into a secure account.

The configuration module 120 can also facilitate management of resource families, which are categories of requests and electronic content for which a particular security policy applies. Thus, the system 100 may allow one or more resource families to bypass operations of the security intermediary 102, while resources in other families must pass through the security intermediary 102 for modification or analysis before being delivered to a client device 112, 114. In some instances, resource families can be defined by directories, uniform resource indicators (URIs), uniform resource locators (URLs), subdomains, or other logical locations of particular resources on a site that is served by the web server 104. If a web serve 104 serves multiple sites or multiple domains, different policies may apply among the different sites and/or domains. An administrator can create, modify and remove resource policies at the configuration module 120, and can indicate which security policy or policies to apply to various families.

An administrator 120 can also configure how the system 100 should apply various security policies based on factors other than or in addition to resource families. For instance, different policies may apply based on characteristics of the device that is making the request or the network on which the requesting device is on. The security intermediary 102 may determine identities of client devices 112, 114 for which a security threat has previously been identified, or it may recognize an account of a user that has previously been associated with security threats. The administrator may configure the system 100 to apply more restrictive security policies to particular requesting client devices 112, 114 or users than would otherwise apply based on the family of the requested resource alone.

At the direction of an administrator or other user with appropriate system privileges, the configuration module 120 can change operating modes in the security intermediary 102 and/or adjust the security policy of one or more resource families, clients, or networks. The security intermediary 102 may be capable of various modification modes that the administrator can apply to a resource family, for example. In some modes, very subtle modifications may be made to elements of the web code in order to detect anomalous or malicious activity, whereas other modes may apply increasingly more complex or widespread modifications that are aimed at preventing unauthorized activity. In some implementations, policy settings or mode changes can be triggered automatically by the configuration module 120.

The configuration module 120 can also allow an administrator to specify how the security intermediary 102 should respond to exceptions. Exceptions can relate to internal system errors or to detection of fraud, malware, abnormal behavior, and/or malicious activity in traffic received from a client device 112, 114. Internal system errors may be logged and transmitted to security server 108 for further analysis or storage. For instances of detected fraud, malware, or alien or malicious web code, the security intermediary 102 can be configured to respond in one or more ways. The intermediary 102 may log the event and transmit it to security server 108 for further analysis. In some implementations, the security intermediary 102 may alert the web server 104 of suspected unauthorized activity, so that the web server 104 can respond in a particular way. For example, in a banking transaction involving suspected fraud, the system 100 can be configured to process the transaction normally, log the transaction, and alert various parties or authorities. Alternatively, the transaction can be thwarted if the security intermediary 102 is configured to alert the web server 104. The web server 104 can respond to a fraud alert by generating a web resource for delivery to an infected or fraudulent client device 114 that indicates the transaction was processed as requested, when in fact it was not.

The administrator may also manage users at the configuration module. For example, various user categories may provide system users with varying levels of use and access privileges to the system 100. In one implementation, the system 100 may provide four user categories: super-users, system operators, analysts, and auditors. Super-users can create other users and are able to access and perform any action provided for by the system 100. The administrator may be a super-user, for instance. System operators can configure the system 100 and view data from the system 100, but cannot manage other users. Analysts can view data from the system 100, but they cannot modify the system's configuration. Finally, an auditor can view a limited set of system data such as how the system was used and by whom.

The configuration module 120 can also provide a portal for various other system settings such as those that may be required for installation and setup of the security intermediary 102, or to configure a particular system setup, such as registration with a security server 108, interoperability with the load balancer 106, and arrangements of multiple security intermediaries 102. The configuration module 120 can be accessible at a terminal on the premises of the security intermediary 102 and can be separate from or integrated with the security intermediary 102. In some implementations, the configuration module 120 can be accessible remotely, such as through an interface at a desktop or mobile computing device that can communicate with the security intermediary 102 through a network.

The security server 108 can receive and analyze security event information from the security intermediary 102. Security event information can include logs and alerts generated by the security intermediary 102 that indicate when the intermediary 102 detects anomalous or malicious activity. Feedback from instrumentation code that the security intermediary 102 supplements with the web code for particular web resources may indicate such anomalous or malicious activity. Likewise, a request from an infected client device 114 that calls an unauthorized function that does not match modifications for a given session may generate an alert by the security intermediary 102.

Information about security events can be forwarded to the security server 108. In one example, the security server 108 can be dedicated to events received from one or more security intermediaries 102 that serve a particular web server 104. In some implementations, the security server 108 can be a centralized server that receives security event information from a plurality of security intermediaries 102 that serve multiple web servers 104 and/or websites. Information on security events 108 from multiple sites can be analyzed in aggregate to study developing security threats, determine whether some anomalous activity may nevertheless be benign (such as traces from an authorized or legitimate browser plug-in), to publish statistics or report information on security events to interested parties, and/or to use in developing updates and improvements to the system 100 for increased performance and security. The security server 108 can analyze information from across multiple computing sessions and/or multiple clients as well.

The security server 108 can also receive operating information from the security intermediary 102 that can be used to monitor system performance. For instance, the security intermediary 102 may track and report information about the speed and volume of modifications that it makes to web code, or information about its usual and peak operating levels. The information can be used to make or recommend system configurations to optimize performance and to compare information from multiple security intermediaries 102 deployed across multiple web servers 104.

Communication between the security intermediary 102 and the client devices 112, 114 can occur over one or more networks, including the internet 110. In some implementations, each client computing device 112 and 114 may connect to a network such as a local area network ("LAN") or a wide area network ("WAN") that is in turn connected to the security intermediary 102 through the internet 110. In some implementations, the system 100 may be installed on a private network rather than, or in addition to, the internet 110. Communications over the internet 110 can be encrypted and verified such as with HTTPS and Secure Sockets Layer ("SSL") protocols.

Describing now one particular example of the operations of the system 100 with reference to FIG. 1B, at step A, the web server 104 responds to a request from client devices 112 and 114 for an electronic resource. The web server 104 accesses or generates the resource, which in the example is a webpage 116A relating to a financial transaction. For instance, the web server 104 may serve an online banking site, www.examplebank.com. The webpage 116A may provide forms for account holders at the client devices 112 and 114 to institute an electronic wire transfer. The forms may include fields that allow the account holders to indicate a source account, a destination account, and the amount to transfer. The webpage 116A may implement the form with HTML tags such as <form> and <input> tags that are each identified by a name. For instance, the destination account field is named "money_dest." The client devices 112 and 114 can use the names in submitting form data to the web server 104 through a GET or POST HTTP request method, for example.

Before the system 100 transmits the webpage 116A over the internet 110 and to each of the client devices 112 and 114, the page 116A is directed to the security intermediary 102. The load balancer 106 may determine which security intermediary 102 to direct the webpage 116A to in implementations where there may be multiple, redundant security intermediaries 102. A policy engine at the security intermediary 102 may determine how the security intermediary 102 will process the webpage 116A. For example, the policy engine may determine that the webpage 116A, which pertains to sensitive financial transactions, is part of a resource family that the intermediary 102 has been configured to modify and to insert instrumentation code. Other resources from the banking site, such as its homepage, may contain less sensitive information and may be subject to lower-level security policies such that the security intermediary 102 may handle the homepage with less sensitivity than the wire transfer webpage 116A.

At steps B1 and B2, the security intermediary 102 processes the webpage 116A according to the governing security policy and transmits processed webpage 116B to client devices 112 and 114. First, the security intermediary 102 may modify elements of the webpage's 116A implicit API, such as field names, function names, and link references. In the example operations of the system 100, the security intermediary 102 changes the name of the destination account field in webpage 116A from "money_dest" to "x1$v4." The name change obscures the identity of the field to prevent malware 118 from learning how to exploit the field. Moreover, the security intermediary 102 can apply different pseudo-random modifications each time the webpage 116A is served to prevent the malware 118 from tracking patterns that the malware 118 could use to exploit the web server 104 or initiate a fraudulent transaction, for example. Other techniques for obscuring content, including obscuring the environment in which web code such as JavaScript operates, are discussed further herein.

Second, the security intermediary 102 can insert instrumentation code into the webpage that can detect certain activity that may indicate alien content (e.g., malware 118 or legitimate code on a client device 112 or 114 that interacts with a web page such as a browser plug-in), and can report the detected activity back to the security intermediary 102 and/or a central security server 108.

Instrumentation code may also collect information about particular activity that occurs on the client device 112 and/or 114. For instance, the instrumentation code may collect information about how a user interacts with the web page such as key strokes, mouse movements, changes in focus between particular forms, fields, or frames, and patterns and timing of interactions with the page. Information about the user's operating environment may also be collected, such as network configurations, operating system information, hardware specifications, performance indicators, session identifiers, other cookies, browser type, browser settings, IP address, MAC address, client device type, plug-ins, screen resolution, installed fonts, timestamp, site or page identifier, GPS data, etc. In some implementations, users and system operators can configure the instrumentation code to restrict or anonymize the data that it gathers to respect user privacy.

The security intermediary 102 can also include an identifier, such as a session identifier in a cookie, with the processed web page 116B. The security intermediary 102 can store the identifier in a data structure, table, or database that correlates the original web code with the modified web code for a particular resource so that the security intermediary 102 can apply reverse modifications to requests based on modified resources before forwarding the request to the web server 104. For example, the security intermediary 102 may assign a unique identifier to the webpage 116A, and store the identifier in a table that associates the resource's original field name, "money_dest," with the modified field name "x1$v4." Later transactions posted to the web server 104 from the modified page 116B can be received by the security intermediary 102 for reverse modification before forwarding the request to the web server 104. The security intermediary 102 can determine which reverse modifications to apply based on the identifier. In some implementations, the identifier can be a session identifier.

At step C1, client device 112 has received the modified (i.e., processed) web code of web page 116B. Client device 112 is a clean device in that no malware 118 that is configured to attack the online banking website has infected the device 112. A user at the client device 112 provides into the fields on the web page 116B the necessary information to complete a wire transfer, such as an indication of the source account, destination account, and transfer amount. The user may then submit the request for a wire transfer, which a browser on the client device 112 converts into an HTTP request to the web server 104 that includes the information submitted by the user with corresponding field names. The HTTP request from client device 112 uses the random field name that the security intermediary 102 generated for the destination account field, "x1$v4."

Instrumentation code 1128 can monitor the webpage 116B on client device 112. In some implementations, the instrumentation code 1128 may determine that malware 118 or other anomalous activity has altered the webpage 116B and may be attempting to initiate an unauthorized transaction. For example, the instrumentation code 1128 may include information about the modified web code for web page 116B, and may be programmed to detect when elements of the modified code are altered at the client device 112. For instance, the instrumentation code may determine whether the document object model ("DOM") for the webpage has been altered, or if the HTTP request based on the webpage uses unexpected values that do not correspond to the modified web code delivered in web page 116B. For instance, the instrumentation code may detect that the client device 114 has called an original function value rather than its modified, replaced value.

Malicious activity can be both detected and deflected in relatively sophisticated manners by changing the environment in which executable code on the client device, such as JavaScript, operates. Detection can occur by identifying certain JavaScript operations or calls that may be made on a page, and instrumenting code that is served with a web page so as to report to a security server system when such operations occur and/or such calls are made (along with information that describes the actions). Deflection occurs by the constant changing of code elements as they are served each time, such as changing the names of elements that will be called by malicious JavaScript, so that the malicious code can never catch up with the changes and thus gives itself away when it tries to interoperate with code known by the system to be stale. As one example, a common method for making changes to a DOM for a web page is the document.write method, and may be used by malicious code to surreptitiously change what the user of a computing device sees on a web page. A security system can (1) instrument served code corresponding to such a method so that the instrumentation code reports calls to the method, and additionally includes data that characterizes such calls, so that the system can detect abnormal activity and perhaps use the additional data to determine whether the abnormal activity is malicious or benign; and (2) change the function name to "document.#3@1*87%5.write" or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumented and continually changed include "getElementById," "getElementByName," XPath commands, and setting of HTML elements in the DOM to particular values.

As instrumented code executes on the client device 112, 114, the code may collect information that characterizes events and statuses of a web page or other resource as described, and may report the information in various manners. In some implementations, the instrumentation reports that includes such information can be sent to the security server 108 and/or the security intermediary 102. The security server 108 may receive instrumentation reports directly from the client devices 112, 114, or indirectly through the security intermediary 102. The instrumentation code may generate and transmit reports periodically or upon request, for instance. Reports can also be transmitted in subsequent HTTP requests from the client device 112, 114 to the web server 104, and can be received by the security intermediary 102. Alternatively or in addition to these techniques, instrumentation reports can be sent to the security intermediary 102 or security server 108 asynchronously, such as through the use of AJAX or WebSocket.

At step C1, malware 118 has not interfered with the transaction, and the HTTP request includes the appropriate modified field names such as "x1$v4" for the "money_dest" field. Therefore, the instrumentation code 1128 does not report the presence of anomalous or malicious activity to the security intermediary 102.

At step C2, client device 114 is shown to have received the modified (i.e., processed) web code for web page 116B. Unlike client device 112, however, client device 114 is compromised with malware 118, such as a man-in-the-browser bot. When a user of the compromised client device 114 submits the wire-transfer transaction, the malware 118 may intervene and replace the destination account field name with "money_dest"—the original field name before the security intermediary 102 modified web page 116A. The bot may use the original field name, for example, based on previous analysis of the banking website in instances where the security intermediary 102 did not modify the field name. The instrumentation code 114B can detect the behavior or consequences of the behavior of malware 118, and generate a report to alert the security intermediary 102 and/or the web server 104 of suspicious activity. The instrumentation code 114B in FIG. 1B, for example, reports the suspicious activity by causing the HTTP request that the user submits for the transaction to include the field name "x1$v4*" in place of the malware's 118 field name "money_dest." The asterisk appended to the end of the modified field name indicates that the instrumentation code 114B detected suspicious activity.

At steps D1 and D2, the security intermediary 102 receives the HTTP requests for the wire-transfer transaction from client devices 112 and 114, decodes the requests, and forwards the decoded requests to the web server 104. The HTTP requests from the client devices 112 and 114 may include a cookie having a session identifier that the security intermediary 102 can use in decoding the HTTP requests. The security intermediary 102 can lookup the session identifier in a translation table, and decode the request by applying reverse modifications that restore the original field and function names, for example. With respect to the request that the intermediary 102 receives from the clean client device 112, the intermediary 102 receives the substitute field name "x1$v4" as expected, decodes the field name by replacing it with "money_dest" and forwards the request to the web server 104 through the load balancer 106. The operation of security intermediary 102 is transparent to the web server 104, and the web server 104 can process the transaction according to the user's request.

With respect to the HTTP request from the compromised client device 114, the security intermediary 102 recognizes the instrumentation code's 114 report of suspicious activity, and sends an alert to the web server 104. The security intermediary 102 can use the session identifier in the HTTP request to determine the appropriate reverse modifications necessary to decode the request. The security intermediary 102 may recognize that the field name "x1$v4*" corresponds to the original "money_dest" field name, but that the instrumentation code 114B appended an asterisk to the field name to indicate possibly malicious activity. The security intermediary 102 can respond to the indication in various ways according to the applicable security policy and/or system configuration settings. In one example shown in step D2, the intermediary 102 forwards the decoded request to the web server 104, but appends the asterisk to the destination account field name, "money_dest*," to notify the web server 104 that the transaction is suspicious, and may indicate the presence of unauthorized alien content. In response, the web server 104 may ignore the alert, complete the transaction and log the alert, refuse to complete the transaction, pretend to complete the transaction, and/or take other appropriate action. In some implementations, the security intermediary 102 may not forward the transaction request to the web server 104 if suspicious activity has been detected.

At step E, the security intermediary 102 may forward information about the transactions between the web server and the client devices 112 and/or 114 to the security server 108. For example, the security intermediary 102 may share information about the transaction from client device 114 in which the instrumentation code 114B reported suspicious activity. The instrumentation code 114B may include a report about the detected suspicious activity and its circumstances that the security intermediary 102 can provide to the security server 108. For example, the report may include information about the client device 114, the abnormal or suspicious activity, the electronic resources and fields involved, and information about the browser, operating system, or other application that the malware 118 may have compromised. Data from the security server 108 can be analyzed with respect to the security intermediary 102 for a particular site, or in aggregate with information from other security intermediaries 102 that serve other websites and web servers 104. The security server 108 can analyze data across multiple computing sessions and for multiple client devices. The analysis from the security server 108 can be used, for instance, to identify new threats, track known threats, and to distinguish legitimate abnormal or alien activity from malicious activity.

Figure 2:
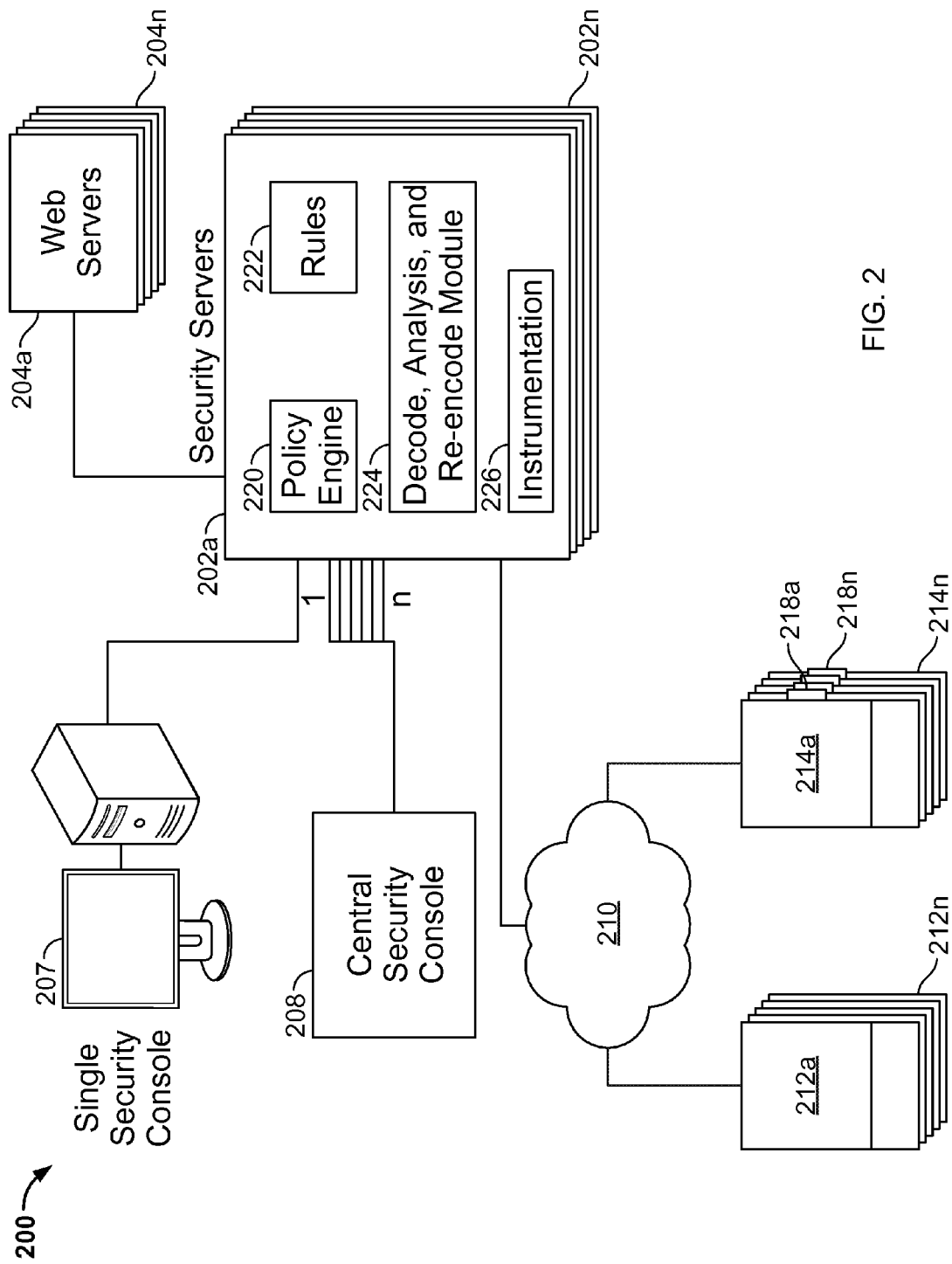
FIG. 2 is a schematic diagram of a system for performing deflection and detection of malicious activity with respect to a web server system.

FIG. 2 is a schematic diagram of a system 200 for performing deflection and detection of malicious activity with respect to a web server system. The system may be the same as the system 100 discussed with respect to FIGS. 1A and 1B, and is shown in this example to better explain the interrelationship of various general features of the overall system 200, including the use of instrumentation code for detection and deflection that is discussed in greater detail throughout this document.

The system 200 in this example is a system that is operated by, or for, a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n, the actual number of sub-systems could vary. For example, certain of the customers could install two separate security server systems to serve all of their web server systems (which could by one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determining naming that may extend across such different pieces of content (e.g., the name of a function or parameter), and such names may be changed in a way that differs each time the content is served, e.g., by replacing a named item with randomly-generated characters. Elements within the different types of content may first be group as having a common effect on the operation of the code, and then may be re-encoded together in a common manner so that their interoperation with each other will be consistent even after the re-encoding.

A rules engine 222 may story analytical rules for performing such analysis and for re-encoding of the content. The rules engine may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served, the generated name may be different. When the name of the parameter is passed back to the web server, it may be re-encoded back to its original name so that this portion of the security process may occur seamless for the web server.

A key for the function that encodes and decodes such strings can be maintained by the security server system 202 along with an identifier for the particular client computer so that the system 202 may know which key or function to apply, and may otherwise maintaining a state for the client computer and its session. A stateless approach may also be employed, whereby the security server system 202 encrypts the state and stores it in a cookie that is saved at the relevant client computer. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

An instrumentation module 226 is programmed to add active code to the content that is served from a web server. The instrumentation is code that is programmed to monitor the operation of other code that is served. For example, the instrumentation may be programmed to identify when certain methods are called, when those methods have been identified as likely to be called by malicious software. When such actions are observed by the instrumentation code to occur, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the OM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by decode, analysis, and re-encode module 224, may be rendered on web browsers of various client computers. Uninfected clients computers 212a-212n represent computers that do not have malicious code programmed to interfere with a particular site a user visits or to otherwise perform malicious activity. Infected clients computers 214a-214n represent computers that do have malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the DOM as discussed above. Reports of illogical activity (e.g., software on the client device calling a method that does not exist in the downloaded and rendered content)

The reports from the instrumentation code may be analyzed and processed in various manners in order to determine how to respond to particular abnormal events, and to track down malicious code via analysis of multiple different similar interactions. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if must of the reported abnormal activity for its web site relates to content elements corresponding to money transfer operations—an indication that stale malicious code may be trying to access such elements surreptitiously.

A central security console may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those cluster in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like. Such collected telemetry data, across many thousands of sessions, may be used by the console 208 to identify what is "natural" interaction with a particular page and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is running bad software.

Figure 3:
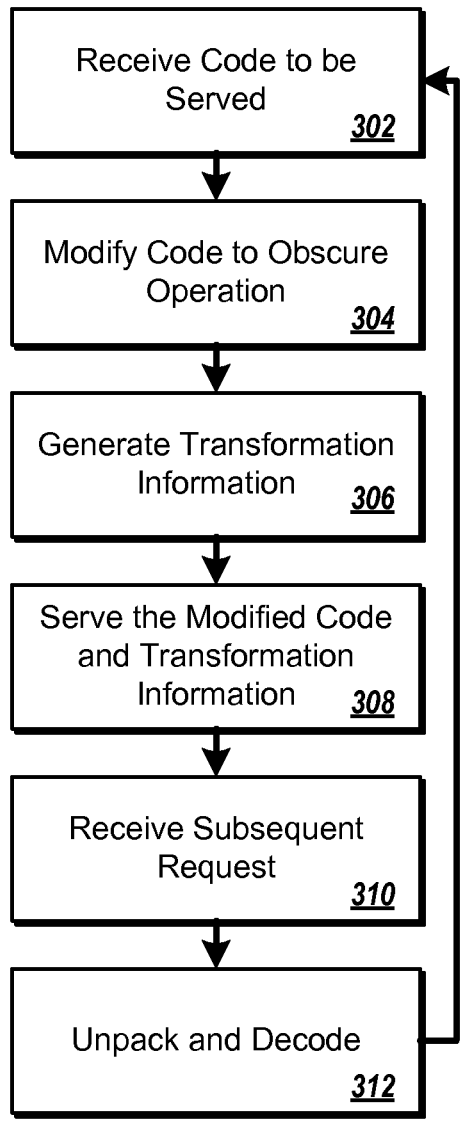
FIG. 3 is a flow chart of a process for managing a state indicator.

FIG. 3 is a flow chart of a process for transforming code passed over the internet. In general, in general, the process involves receiving content to be served to a client device and transforming that content so as to obscure the operation of the webpage that serves the content, so that malicious code cannot attempt to take advantage of such operation of the webpage. The process also involves receiving requests from a client to which the content was served, and using information passed with the request to reverse transform the provided content, and then provide that transformed content to a Web server that serves the original webpage.

The process begins a box at 302, where code to be served is received, such as from a web server that is connected to a security server system. At box 304, the security server system modifies the code to obscure its operation. For example, as discussed above, names of methods, functions, parameters, and other items may be changed into seemingly random strings of text, where the changes are made consistently across HTML code, CSS code, and JavaScript code, so that calls between the different types of codes can be properly answered after the transformation (e.g., when the types of code are executed on the client device).

At box 306, the transformation information is generated. Generally, such information would be generated before the modification so that it could be used in performing the modification, such as by providing the transformation information to a function that transforms the content and uses the provided information as a parameter for the transformation. The step here involves taking the transformation information and packaging it for transmission to the client device. At box 308, the modified code and the transformation information are served to the client device. Such service involves transmission in a single communication, or the transformed content may be provided separately from the transformation information. The transformation information may be provided in a manner that it will exhibit its self as a cookie or similar item on the client device.

At box 310, the system receives a subsequent request from the client device. The request may take a variety of forms, and may be generated as a result of a user interaction with the web page that was served to the client device. For example, perhaps a user of the client device chooses to enter text into a form on his or her bank web page so as to transfer funds between accounts. When the user clicks a button to execute the transfer, a request may be sent back to the Web server for the bank and be intercepted by a security subsystem. The request may have the transformation information appended to it, and the security subsystem may use such transformation information in the same manner it was used when initially transforming the content to be served. However in this instance, the transformation is operated in the reverse direction, so that transformed text may be reverted to its original form that was served by the Web server. Thus, at box 312, the received request is unpacked and decoded, and it least a portion of the request is passed to the Web server in its reverse transformed format.

Figure 4:
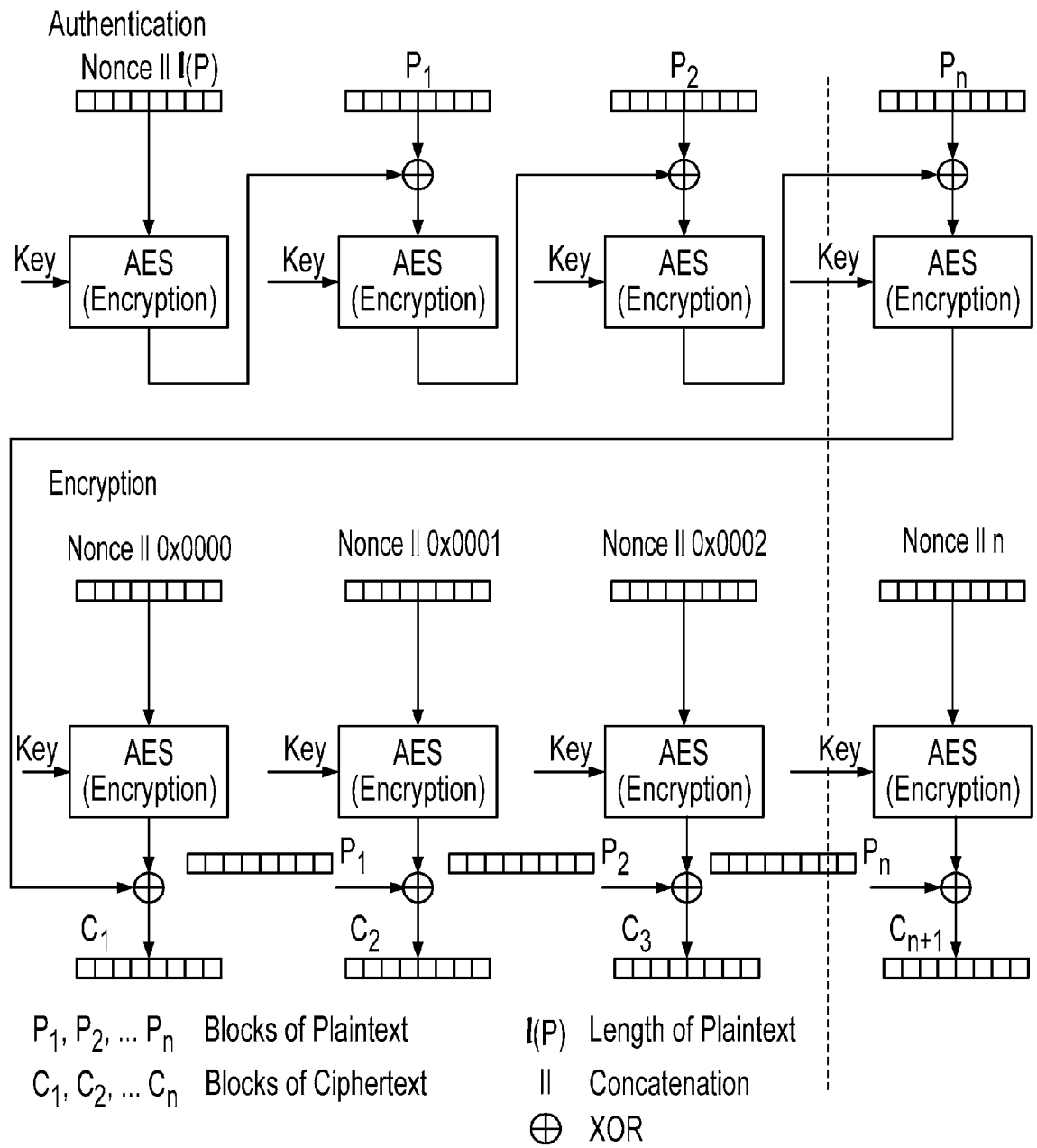
FIG. 4 shows schematically an encryption process.

FIG. 4 shows a process for encryption. The process generally follows the format of AES encryption using CCM block mode (e.g., RFC 3610 and NIST special publication 800-38C), to provide both assurance and confidentiality and authenticity of a serialized data structure provided to the client device. This is the same block mode used for WPA2 in the IEEE 802.11i standard. The use of the nonce as illustrated in the earlier example case is required for the CCM block mode of operation. The nonce is not a secret, but should have a very high probability of being unique and be unpredictable. A 112 bit random number provides sufficient probability and leaves 16 bits for the counter in a 128 bit block. The nonce should be passed in the clear, as it is required (in addition to the key) to decrypt the ciphertext. To facilitate this approach with key management, all security servers for a given web site share a common, but randomly chosen, 256 bit key.

The potential for replay attacks from storing information at a client device can be mitigated by (a) including a timestamp in the encrypted cookie, so that GETs/POSTs received after a reasonable amount of time are simply ignored; and (2) keeping at each security server a circular buffer of processed (received) nonces, so that the servers refuse subsequent GETs/POSTs reusing the same nonce. Nonces in the buffer older than the timeout value can be discarded.

Figure 5:
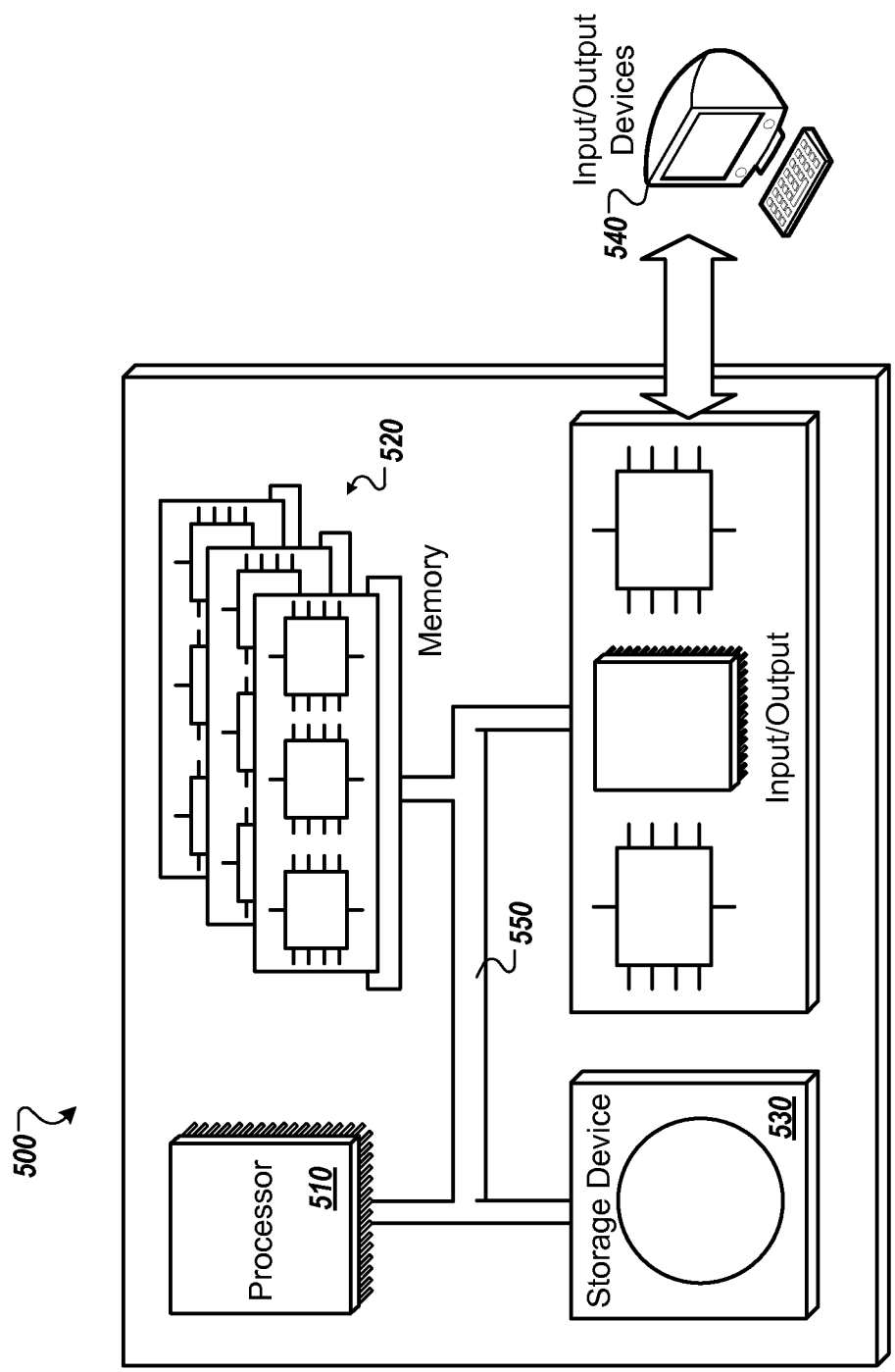
FIG. 5 is a schematic diagram of a computer system.

FIG. 5 is a schematic diagram of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the subject matter may be embodied as methods, systems, devices, and/or as an article or computer program product. The article or computer program product may comprise one or more computer-readable media or computer-readable storage devices, which may be tangible and non-transitory, that include instructions that may be executable by one or more machines such as computer processors.

What is claimed is:

1. A computer-implemented method for coordinating content transformation, the method comprising:
    receiving, at a computer server subsystem and from a web server system, computer code to be served in response to a request from a computing client over the internet;
    modifying the computer code, so as to obscure operation of the web server system that could be determined from the computer code, by replacing original portions of the computer code with corresponding obfuscated portions of computer code;
    generating reverse transformation information that is needed in order to reverse the modifications of the computer code to obscure the operation of the web server system, the reverse transformation information including a nonce and ciphertext that collectively indicate a manner in which to determine the original portions of the computer code from the modified computer code, wherein the nonce and the ciphertext are distinct from each other, wherein the ciphertext is separate from the obfuscated portions of computer code;
    serving, to the computing client, the modified computer code and the reverse transformation information that includes the nonce and the ciphertext that is separate from the obfuscated portions of computer code;
    after serving the modified computer code and the reverse transformation information, receiving, at the computer server subsystem and from the computing client, a second request that was initiated from the modified computer code on the computing client, the second request including (i) the reverse transformation information and (ii) an obfuscated parameter value that results from the obfuscated portions of computer code, wherein the ciphertext in the reverse transformation information is not a part of the obfuscated parameter value;
    determining a de-obfuscated parameter value from the obfuscated parameter value using the ciphertext from the reverse transformation information received in the second request; and
    providing the de-obfuscated parameter value to the web server system.

2. The computer-implemented method of claim 1, wherein determining the de-obfuscated parameter value further comprises applying a private key held by the computer server subsystem to the reverse transformation information.

3. The computer-implemented method of claim 1, wherein the reverse transformation information comprises an initiation vector for a text transformation process that has a forward function and an inverse backwards function.

4. The computer-implemented method of claim 1, wherein modifying the computer code, so as to obscure operation of the web server system that could be determined from the computer code, comprises changing names of functions in the computer code.

5. The computer-implemented method of claim 1, wherein modifying the computer code, so as to obscure operation of the web server system that could be determined from the computer code, comprises changing values of attributes in the computer code.

6. The computer-implemented method of claim 5, wherein modifying the computer code, so as to obscure operation of the web server system that could be determined from the computer code, comprises changing values associated with at least one of a link, a form, a field, and a function in an HTML document.

7. The computer-implemented method of claim 1, wherein modifying the computer code, so as to obscure operation of the web server system that could be determined from the computer code, comprises at least one of adding, removing, and rearranging content in a web document.

8. The computer-implemented method of claim 1, wherein the obfuscated parameter value is an obfuscated HTML attribute value.

9. A computer system for coordinating content transformation, the system comprising:
  a communications interface configured to obtain, from a web server, a resource in the form of computer code that is to be served over a network to a client computing device; and
  a security intermediary configured to:
    (i) modify the resource by re-coding the computer code to obscure an operational design of the web server that could be determined from the computer code,
    (ii) generate reverse transformation information that specifies a manner in which to apply reverse transformations to requests from the client computing device that result from actions taken on the modified resource at the client computing device, wherein the reverse transformation information comprises a nonce and ciphertext that collectively indicate a manner in which to reverse the re-coding of the computer code, wherein the nonce and the ciphertext are distinct from each other, wherein the ciphertext is separate from the re-coded computer code,
    (iii) transmit to the client computing device the modified resource and the reverse transformation information that includes the nonce and the ciphertext that is separate from the re-coded computer code, and
    (iv) determine a de-obfuscated parameter value from an obfuscated parameter value received from the client computing device to which the modified resource and the reverse transformation information was transmitted, wherein the obfuscated parameter value is provided to the security intermediary by the client computing device as a result of user input interacting with the modified resource executing at the client computing device, wherein the obfuscated parameter value does not include the ciphertext.

10. The computer system of claim 9, wherein the security intermediary is further configured to supplement the computer code for the resource with instrumentation code that is programmed to execute on the client computing device and to report to a security server information that characterizes events related to the modified resource executing at the client computing device.

11. The computer system of claim 10, wherein the instrumentation code is further programmed to report indications of abnormal events detected at the client computing device, the abnormal events being events that occur not as a result of the re-coded computer code for the modified resource that is served to the client computing device.

12. The computer system of claim 10, wherein the instrumentation code is further programmed to report attempts detected at the client computing device to interact with an unmodified form of the computer code.

13. One or more non-transitory computer-readable media having instructions stored thereon that, when executed by one or more processors, cause performance of operations comprising:
  receiving, at a computer server subsystem and from a web server system, computer code to be served in response to a request from a computing client over the internet;
  modifying the computer code, so as to obscure operation of the web server system that could be determined from the computer code, by replacing original portions of the computer code with corresponding obfuscated portions of computer code;
  generating reverse transformation information that is needed in order to reverse the modifications of the computer code to obscure the operation of the web server system, the reverse transformation information including a nonce and ciphertext that collectively indicate a manner in which to determine the original portions of the computer code from the modified computer code, wherein the nonce and the ciphertext are distinct from each other, wherein the ciphertext is separate from the obfuscated portions of computer code;
  serving, to the computing client, the modified computer code and the reverse transformation information that includes the nonce and the ciphertext that is separate from the obfuscated portions of computer code;
  after serving the modified computer code and the reverse transformation information, receiving, at the computer server subsystem and from the computing client, a second request that was initiated from the modified computer code on the computing client, the second request including (i) the reverse transformation information and (ii) an obfuscated parameter value that results from the obfuscated portions of computer code, wherein the ciphertext in the reverse transformation information is not a part of the obfuscated parameter value;
  determining a de-obfuscated parameter value from the obfuscated parameter value using the ciphertext from the reverse transformation information received in the second request; and
  providing the de-obfuscated parameter value to the web server system.

14. The one or more non-transitory computer-readable media of claim 13, wherein determining the de-obfuscated parameter value further comprises applying a private key held by the computer server subsystem to the reverse transformation information.

15. The one or more non-transitory computer-readable media of claim 13, wherein the reverse transformation information comprises an initiation vector for a text transformation process that has a forward function and an inverse backwards function.

16. The one or more non-transitory computer-readable media of claim 13, wherein the obfuscated parameter value is an obfuscated HTML attribute value.

17. A computer-implemented method for coordinating content transformation, the method comprising:
  receiving, at a computer server subsystem and from a web server system, computer code to be served in response to a request from a computing client over the internet;
  modifying the computer code, so as to obscure operation of the web server system that could be determined from the computer code, by replacing original portions of the computer code with corresponding obfuscated portions of computer code;
  generating reverse transformation information that is needed in order to reverse the modifications of the computer code to obscure the operation of the web server system, the reverse transformation information including a nonce and ciphertext that collectively indicate a manner in which to determine the original portions of the computer code from the modified computer code, wherein the nonce and the ciphertext are distinct from each other, wherein the ciphertext is separate from the obfuscated portions of computer code; and serving, to the computing client, the modified computer code and the reverse transformation information that includes the nonce and the ciphertext that is separate from the obfuscated portions of computer code, wherein modifying the computer code comprises replacing in the computer code (i) a first original portion of the computer code with a first obfuscated portion of the computer code and (ii) a second original portion of the computer code with a second obfuscated portion of the computer code, the second original portion of the computer code being distinct from the first original portion of the computer code, wherein the nonce and the ciphertext collectively indicate a manner in which to determine both the first original portion of the computer code and the second original portion of the computer code from the first obfuscated portion of the computer code and the second obfuscated portion of the computer code, respectively.

18. The computer-implemented method of claim 17, further comprising receiving a subsequent request and the reverse transformation information from the computing client, and using the reverse transformation information to apply a reverse transformation to at least a portion of the subsequent request to determine at least the first original portion of the computer code from the first obfuscated portion of the computer code.

19. The computer-implemented method of claim 18, further comprising applying a private key held by the computer server subsystem to the reverse transformation information to apply the reverse transformation to the at least the portion of the subsequent request.

20. The computer-implemented method of claim 17, wherein the reverse transformation information comprises an initiation vector for a text transformation process that has a forward function and an inverse backwards function.

21. The computer-implemented method of claim 17, wherein the first original portion of the computer code comprises an HTML attribute value, wherein the first obfuscated portion of the computer code comprises an obfuscated HTML attribute value.

22. One or more non-transitory computer-readable media having instructions stored thereon that, when executed by one or more processors, cause performance of operations comprising:

receiving, at a computer server subsystem and from a web server system, computer code to be served in response to a request from a computing client over the internet;

modifying the computer code, so as to obscure operation of the web server system that could be determined from the computer code, by replacing original portions of the computer code with corresponding obfuscated portions of computer code;

generating reverse transformation information that is needed in order to reverse the modifications of the computer code to obscure the operation of the web server system, the reverse transformation information including a nonce and ciphertext that collectively indicate a manner in which to determine the original portions of the computer code from the modified computer code, wherein the nonce and the ciphertext are distinct from each other, wherein the ciphertext is separate from the obfuscated portions of computer code; and serving, to the computing client, the modified computer code and the reverse transformation information that includes the nonce and the ciphertext that is separate from the obfuscated portions of computer code, wherein modifying the computer code comprises replacing in the computer code (i) a first original portion of the computer code with a first obfuscated portion of the computer code and (ii) a second original portion of the computer code with a second obfuscated portion of the computer code, the second original portion of the computer code being distinct from the first original portion of the computer code, wherein the nonce and the ciphertext collectively indicate a manner in which to determine both the first original portion of the computer code and the second original portion of the computer code from the first obfuscated portion of the computer code and the second obfuscated portion of the computer code, respectively.

23. The one or more non-transitory computer-readable media of claim 22, wherein the operations further comprise receiving a subsequent request and the reverse transformation information from the computing client, and using the reverse transformation information to apply a reverse transformation to at least a portion of the subsequent request to determine at least the first original portion of the computer code from the first obfuscated portion of the computer code.

24. The one or more non-transitory computer-readable media of claim 23, wherein the operations further comprise applying a private key held by the computer server subsystem to the reverse transformation information to apply the reverse transformation to the at least the portion of the subsequent request.

25. The one or more non-transitory computer-readable media of claim 22, wherein the reverse transformation information comprises an initiation vector for a text transformation process that has a forward function and an inverse backwards function.

26. The one or more non-transitory computer-readable media of claim 22, wherein the first original portion of the computer code comprises an HTML attribute value, wherein the first obfuscated portion of the computer code comprises an obfuscated HTML attribute value.

* * * * *